May 23, 1950     J. E. CARTER     2,508,443
SEALED JOINT FOR CONCRETE SLAB ROAD PAVEMENTS

Filed Aug. 20, 1946

*INVENTOR.*
JOHN E. CARTER
BY
Des Jardins & Compton
HIS ATTORNEYS

Patented May 23, 1950

2,508,443

UNITED STATES PATENT OFFICE 2,508,443

SEALED JOINT FOR CONCRETE SLAB ROAD PAVEMENTS

John E. Carter, Columbus, Ohio

Application August 20, 1946, Serial No. 691,689

11 Claims. (Cl. 94—18)

This invention relates to a sealed joint for concrete slab road pavements wherein an elastomeric vertical joint sealing strip cooperates with dowel bars passed therethrough and mounted in casings held embedded in the concrete, which casings are water proofedly connected to the vertical joint sealing strip by a novel elastomeric seal which permits movement of said casings, relatively to the strip, without interfering with said waterproof connections.

This is an improvement over the construction shown in my copending application for United States Letters Patent, Serial No. 662,368, filed April 15, 1946. In my said former application, I provided a vertical joint construction for concrete slab road pavements wherein a vertical joint sealing strip made of elastomeric material was pierced at intervals by dowel bar apertures, and wherein the dowel bars which were passed through said apertures were embedded in metal casings on either side, said casings abutting closely to said vertical strips and being joined by an internal sleeve which cooperated with the casings and the vertical strip to render the joint and dowel bars relatively waterproof under conditions of expansion and contraction of the associated concrete slabs. My improvement over this construction, by the invention disclosed herein, pertains to new and novel means for joining dowel bar casings to an elastomeric vertical joint sealing strip, so that a more positive waterproof condition is obtained.

Particularly I have provided an elastomeric seal, one for each dowel bar casing, which seal is formed in an annular manner to provide a hole so as to admit passage of the dowel bar, and which hole is formed with an internally-grooved lip to cooperate with a groove on the dowel bar casing so as to form a watertight seal therewith. The seal has an external formation, a neck portion of which enters into a dowel bar aperture in the vertical strip, from one side, to form a centering bushing for the dowel bar and a flange portion which abuts the vertical face of the vertical strip. In use the seal is cemented to the vertical face of the strip and to another similar seal entering the aperture from the opposite side of the strip. Furthermore, my construction is so arranged that it cooperates with compressible and elastomeric characteristics of my vertical strip, so that compression of the seal ends within the strip will cause no rupture thereof. The compressible and elastomeric strip which I prefer to use in my novel seal is disclosed in my copending application for United States Letters Patent, Serial No. 670,793, filed May 18, 1946.

While any suitable elastomeric, tough, resilient and waterproof material can be used for my novel seal, I prefer to use rubber, rubber-like material, or one of the oil-resistant compounds of a butadiene-acrylonitrile copolymer, vulcanized to a tough resilience.

Therefore, the principal object of my invention is to provide a novel seal for sealing dowel bar casings to vertical joint sealing strips used in concrete slab road pavement construction.

Another object of my invention is to provide a vertical joint construction for slab pavements joined by dowel bars and having an elastomeric joint strip, wherein an annular elastomeric seal is used to make a mechanical bond connection with the dowel bar casing and dowel bar and which is bonded by pressure and cement to the elastomeric strip.

Another object of my invention is to provide a water proof, flexible, non-rupturable sealed joint between a vertical joint sealing strip and cooperating encased dowel bars, which are used in concrete slab road pavement construction.

Further objects, and objects relating to details and economies of construction and operation, will definitely appear from the detailed description to follow. In one instance, I have accomplished the objects of my invention by the devices and means set forth in the following specification. My invention is clearly defined and pointed out in the appended claims. Structures constituting preferred embodiments of my invention are illustrated in the accompanying drawings forming a part of the specification, in which:

In the drawings, the same reference numerals refer to the same parts throughout the several views.

Figure 1:
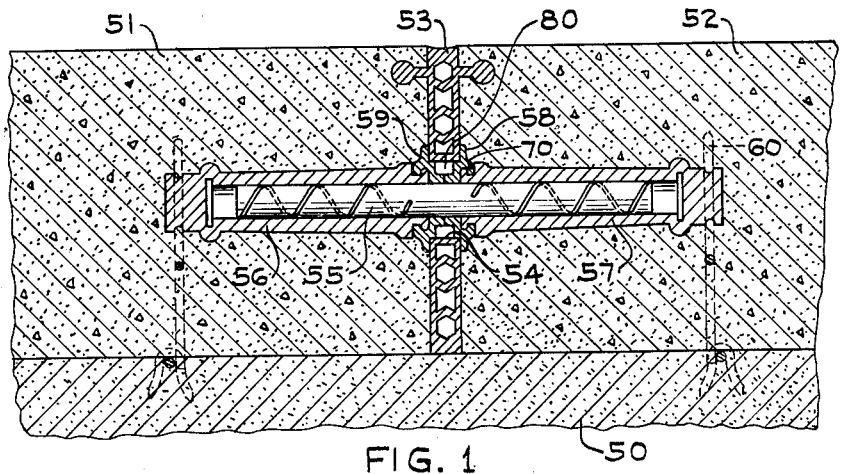
Fig. 1 is a vertical section through two adjoining slabs of a concrete road pavement separated by an elastomeric strip and provided with encased dowel bars joined to the strip by the novel seal. The view also shows the means by which the construction is held in place on the road base prior to the casting of the concrete thereabout.
Figure 2:
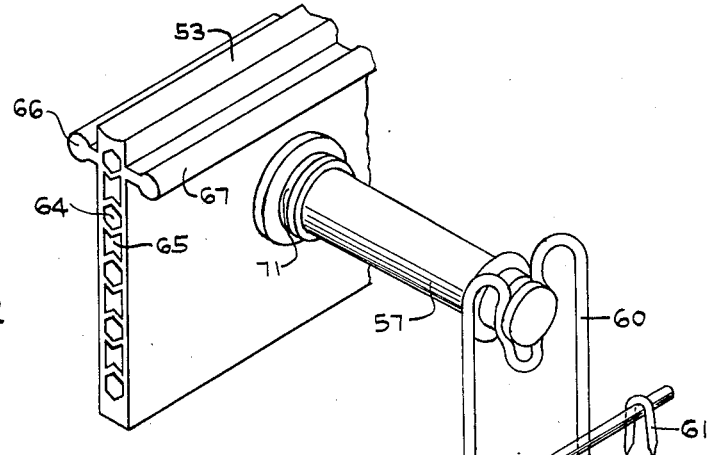
Fig. 2 is a perspective view of my novel construction showing one of the dowel bar casings, the seal and the vertical strip in relative position.

Referring to Fig. 1, my novel construction is shown in position on a road base 50. Prior to the casting of concrete slabs 51 and 52, the vertical joint sealing strip 53 made of elastomeric material is placed on the road base at the intended joint. At intervals therealong, through dowel bar apertures, such as aperture 54, dowel bars, such as dowel bar 55, are passed through and fitted on either end with casings, such as casings 56 and 57, having on their inner ends my novel seals, like seals 58 and 59, which are, as will be described, bonded to each other and to the vertical joint sealing strip. The ends of the dowel bar casings are supported on chairs like chair 60 (Fig. 2) held to the road base by a fastening means such as staples 61 and 62.

Referring more particularly to the construction of the vertical joint sealing strip, which is, as has been said, fully set out in my copending United States application, Serial No. 670,793, the strip material is preferably rubber, rubber-like material, or a compound of butadiene-acrylonitrile copolymer material vulcanized to a tough resilience. The strip 53 has running through it, lengthwise thereof, a series of parallel channels, like channels 64 and 65 (Fig. 2) which permit compression of the strip laterally by the forces of expansion of the concrete slabs, without in any way causing vertical distortion of the strip to cause it to project above the ordinary road level. On either side of the strip are provided bonding beads 66 and 67, which, when buried in the concrete, mechanically bond it thereto and prevent water from penetrating downwardly along the sides of the strip. At intervals along the strip, which intervals correspond to the intended dowel bar spacings, are transverse apertures, like aperture 54 (Fig. 1) which are larger in diameter than the dowel bar which is supposed to pass therethrough, said additional diameter being provided for the external formation of a portion of the novel seal which will be described.

Figures 3, 4:
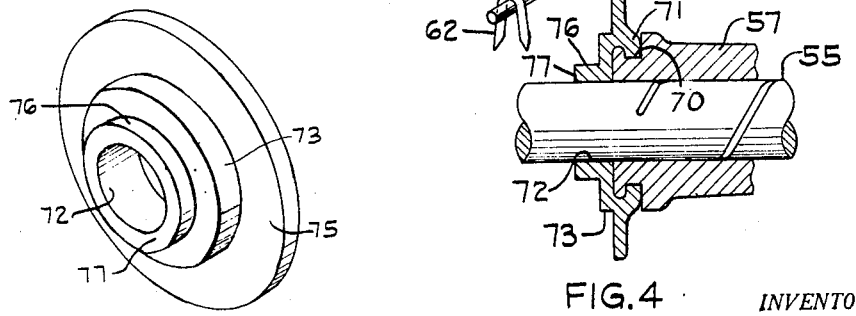
Fig. 3 is a perspective view of my novel seal, taken from the end which abuts the vertical face of the joint sealing strip.
Fig. 4 is a sectional view through my novel seal and a portion of a cooperating dowel bar casing, said section being the same as shown for one of the seals illustrated in Fig. 1, but enlarged.

A dowel bar casing is provided for each end of a dowel bar, said casings having formations on the exterior thereof which hold them fast in the concrete, to prevent any movement thereof relative to the concrete. On the open end of the dowel bar casings, like casings 56 and 57, is an annular groove 70 (Fig. 4) over which the lip 71 of the seal engages in a waterproof fit. The internal bore 72 of the seal, of smallest diameter, snugly fits the dowel bar passing therethrough and an outer formation 73, such as an annular flange or projection, snugly fits the aperture in the strip. The plate-like flange 75 is adapted to abut face to face with the side of the strip. The neck 76 is, approximately, in length one-half the width of the strip so that as two seals, entering from opposite sides, meet centrally of the strip, the surfaces 77 will be in contact, as shown in Fig. 1. This construction leaves an aperture 80 within the strip, between the necks of the seals and the strip, which will accommodate excess material under conditions which bulge the seals when the slabs expand and force the dowel bar casings toward one another.

In assembly, as the dowel bar casings are slipped onto either end of the dowel bars which have been inserted through the associated aperture in the strip, it being assumed that the seals have been put on the ends of the casings beforehand, bonding cement is placed on the portions 77, 75 and 73 of the seal, which will cement the seals to the strip and to each other after said cement has set.

It will be observed that, after concrete has been poured around the assembly, the mechanical bond of the seal to the associated dowel bar casing is such that it cannot release and is held permanently in place, that the seal is cemented face to face with the joint sealing strip, and that the meeting ends of the seal from opposite sides are cemented together, so that no water can get into the dowel bar apertures in the dowel bar casings, and yet the structure is free to move, within certain limits, with the concrete during periods of expansion and contraction thereof.

I am aware that the device and construction disclosed herein may be varied considerably without departing from the spirit of my invention and, therefore, I claim my invention broadly, as indicated by the appended claims.

Having thus described my invention, what I claim as new and useful and desire to secure by Letters Patent is:

1. A joint sealing ring for sectional dowel bar casings which can be joined to an interposed vertical joint sealing strip that is adapted to be used in concrete slab pavement construction, said sealing strip having dowel bar apertures therein, consisting of an annular ring of elastomeric material, said ring having the hole therein formed so as to admit the passage of a dowel bar therethrough, a circular lip surrounding said hole on one side of the ring to engage the dowel bar casing with which it cooperates, and a portion projecting from the side of the ring opposite the circular lip and adapted to fit into a dowel bar aperture in the sealing strip and having a plate-like flange angularly-disposed to the exterior formations to form a face-to-face seal with the vertical face of the strip on said side.

2. A joint sealing ring for sectional dowel bar casing which can be joined to an interposed vertical joint sealing strip that is used in concrete slab paving constructions and is apertured for dowel bars, consisting of an annular ring made of elastomeric material, said ring having the hole formed therein so as to snugly admit the passage of a dowel bar therethrough at one portion of the length of said hole, a circular lip surrounding said hole on one side of the ring to engage the dowel bar casing with which it cooperates, and a plurality of portions projecting from the ring on the side opposite the circular lip, one of which projects into the aperture in the vertical strip between the dowel bar and the circumference of said aperture in the strip, to approximately half way into said aperture in the strip, and another of said projections on said ring forming a plate-like flange angularly disposed to the first-mentioned formations and adapted to make a face-to-face seal with the vertical face of the strip on the side into which said seal is admitted, whereby a water-tight flexible joint between the dowel bar casings and said strip is obtained.

3. In a dowel bar and vertical joint sealing strip construction for concrete road pavements wherein the dowel bars pass through dowel bar apertures in said strip and project into the casings on either end, which casings are held embedded in the concrete cast on either side of said strip, said casings being waterproof except at the ends thereof which face the strip when in place, and said ends having an annular flange thereon, including in combination, a first annular ring of elastomeric material, said ring having the hole formed therein so as to admit the passage of the dowel bar therethrough, the surface bounding said hole being circumferentially grooved at an enlarged end thereof to form a circular lip to engage the flange on the strip end of the associated dowel bar casing, and said ring having an exterior formation which projects half way into the associated dowel bar aperture in the strip to center said dowel bar in the hole in the strip, and said seal having a plate-like flange which meets face to face with the vertical face of the strip on the side of the strip from which it enters; and a second seal having the same formation as the first-mentioned seal, which seal cooperates with the dowel bar casing on the opposite side of the strip associated with said dowel bar, and which engages the flange on said other casing by means of the circular lip, and which projects through the hole in the vertical strip to meet the first seal, and which forms a face-to-face seal with the vertical face of the strip on the said opposite side, whereby a dowel bar encased in said casings and passing through said strip is, by reason of the elastomeric character of the material used in said seal, protected from the entry of water therein during contraction and expansion of the concrete slabs with which said joint is associated.

4. The seal of claim 1 wherein the material used for the seal is rubber.

5. The seal of claim 1 in which the material used for the seal is a butadiene-acrylonitrile copolymer compounded and vulcanized to a tough resilience.

6. The combination of claim 3 wherein the material used for the seal is rubber.

7. The combination of claim 3 wherein the material used for the seal is a compound of a butadiene acrylonitrile copolymer vulcanized to a tough resilience.

8. The combination of claim 3 in which the two seals are bonded to the vertical strip and to each other.

9. The combination of claim 3 wherein the material used for the seal is a compound of butadiene acrylonitrile copolymer material vulcanized to a tough resilience, and wherein the seals are cemented to the face of said strip and to each other when in position.

10. The seal of claim 2 wherein the material used for the seal is rubber.

11. The seal of claim 2 wherein the material used for the seal is a butadiene acrylonitrile copolymer compounded and vulcanized to a tough resilience.

JOHN E. CARTER.

REFERENCES CITED

The following references are of record in the file of this patent:

UNITED STATES PATENTS

| Number | Name | Date |
|---|---|---|
| 1,510,806 | Snider | Oct. 7, 1924 |
| 2,042,524 | Hall et al. | June 2, 1936 |
| 2,419,022 | Heltzel | Apr. 15, 1947 |